United States Patent
Bar-Zeev et al.

(10) Patent No.: US 11,697,068 B2
(45) Date of Patent: Jul. 11, 2023

(54) MOBILE PLATFORM AS A PHYSICAL INTERFACE FOR INTERACTION

(71) Applicant: Meta View, Inc., San Mateo, CA (US)

(72) Inventors: Avi Bar-Zeev, Oakland, CA (US); Gerald Wright, Jr., Cardiff, CA (US); Alexander Tyurin, Hillsborough, CA (US); Diego Leyton, San Mateo, CA (US)

(73) Assignee: Campfire 3D, Inc., San Mateo, CA (US)

( * ) Notice: Subject to any disclaimer, the term of this patent is extended or adjusted under 35 U.S.C. 154(b) by 4 days.

(21) Appl. No.: 17/286,053

(22) PCT Filed: Oct. 16, 2019

(86) PCT No.: PCT/US2019/056529
§ 371 (c)(1),
(2) Date: Apr. 16, 2021

(87) PCT Pub. No.: WO2020/081677
PCT Pub. Date: Apr. 23, 2020

(65) Prior Publication Data
US 2021/0354038 A1 Nov. 18, 2021

Related U.S. Application Data

(60) Provisional application No. 62/747,005, filed on Oct. 17, 2018.

(51) Int. Cl.
*A63F 13/533* (2014.01)
*A63F 13/212* (2014.01)
(Continued)

(52) U.S. Cl.
CPC .......... *A63F 13/533* (2014.09); *A63F 13/212* (2014.09); *A63F 13/235* (2014.09);
(Continued)

(58) Field of Classification Search
CPC .. A63F 13/533; A63F 13/212; A63F 13/5255; A63F 13/323; A63F 13/426; A63F 13/235
See application file for complete search history.

(56) References Cited

U.S. PATENT DOCUMENTS 10,089,005 B2 10/2018 Xu et al.
2014/0152558 A1 6/2014 Salter et al.
(Continued)

FOREIGN PATENT DOCUMENTS

WO 2017201162 A1 11/2017

OTHER PUBLICATIONS

The extended European search report, dated Jun. 15, 2022, in the related European Appl. No. 19874206.6.
(Continued)

*Primary Examiner* — Omkar A Deodhar

(57) ABSTRACT

Systems and methods to provide a mobile computing platform as a physical interface for an interactive space are presented herein. The interactive space may be experienced by a user of a host device (e.g., headset). The interactive space may include views of virtual content. A position and/or heading of the mobile computing platform relative to a perceived position and/or heading of the virtual content of the interactive space may be determined. Remote command information may be determined based on the relative position information and/or user input information conveying user entry and/or selection of one or more input elements of the mobile computing platform. The remote command information may be configured to effectuate user interactions with the virtual content in the interactive space based on user interactions with the mobile computing platform.

36 Claims, 8 Drawing Sheets

(51) Int. Cl.
  *A63F 13/235*    (2014.01)
  *A63F 13/323*    (2014.01)
  *A63F 13/426*    (2014.01)
  *A63F 13/5255*   (2014.01)

(52) U.S. Cl.
  CPC .......... *A63F 13/323* (2014.09); *A63F 13/426* (2014.09); *A63F 13/5255* (2014.09)

(56) References Cited

U.S. PATENT DOCUMENTS

| | | |
|---|---|---|
| 2014/0168261 A1 | 6/2014 | Margolis et al. |
| 2017/0336941 A1 | 11/2017 | Gribetz |
| 2018/0059777 A1 | 3/2018 | Kobayashi et al. |

OTHER PUBLICATIONS

Rebecca Hills-Duty, "A Guide to HTC Vive's Wand Controllers—GMW3", Jul. 11, 2017, XP055927824, Retrieved from the Internet: URL:https://www.gmw3.com/2017/07/a-guide-to-htc-vives-wand-controllers/.
The Communication pursuant to Rules 70(2) and 70a(2) EPC, dated Jul. 5, 2022, in the related European Appl. No. 19874206.6.
The Internatinal Search Report and Written Opinion, dated Jan. 14, 2020, in the corresponding PCT Appl. No. PCT/US19/56529.

MOBILE PLATFORM AS A PHYSICAL INTERFACE FOR INTERACTION

CROSS-REFERENCE TO RELATED APPLICATIONS

This application is a National Stage Application of PCT/US2019/056529 filed on Oct. 16, 2019, which claims priority from U.S. Provisional Patent Application No. 62/747,005 filed on Oct. 17, 2018. Each of prior mentioned applications is hereby expressly incorporated by reference herein in its entirety.

FIELD OF THE INVENTION

The systems and methods described herein relate to providing a mobile computing platform as a physical interface tool for an interactive space.

BACKGROUND OF THE INVENTION

There are many types of vision systems that provide virtual and/or augmented reality (VR and/or AR) displays. In particular, wearable technology such as head mounted displays (HMD) may be used. The wearable technology may present a user with images of virtual content that may be perceived by the user to be present in the real-world. The user may interact with the virtual content using hand gestures.

SUMMARY

One or more implementations of the systems and methods described herein facilitate providing a mobile computing platform as a physical interface tool for an interactive space. An interactive space may include one or both of a virtual reality environment and/or an augmented reality environment. An augmented reality environment may include views of images of virtual content superimposed over views of a real-world environment. A virtual reality environment may include views of images of virtual content within a virtual environment. A user may utilize the mobile computing platform as a remote control for interacting with virtual content. For example, the mobile computing platform may be used to point at and/or select virtual content for interaction. The mobile computing platform may facilitate precision selection of virtual content that may be difficult if such selection was attempted by physical hand gestures alone. The mobile computing platform may present a user interface that includes input elements. The user may select one or more input elements to effectuate one or more interactions with virtual content that the mobile computing platform may be pointing at. Other interactions are described herein.

A system configured to provide a mobile computing platform as a physical interface for an interactive space may include one or more of a host device, a mobile computing platform, and/or other components. The host device may be configured to be worn by a user. The host device may include one or more of one or more physical processors, one or more image-forming components, and/or other components. The one or more image-forming components may be configured to generate light rays to form images of virtual content. The one or more image-forming components may be configured to present the images to the user. The images may be superimposed over views of the real world to create an interactive space. By way of non-limiting illustration, the virtual content may be perceived by the user to be present in the real world. The virtual content may include one or more virtual objects.

The one or more physical processors of the host device may be configured by machine-readable instructions. The machine-readable instructions may include one or more computer program components. The computer program components may include one or more of a content component, a control component, a relative position component, a communication component, and/or other components.

The content component may be configured to obtain information defining virtual content. The information defining the virtual content may include information defining one or more of a visual appearance of the virtual content, one or more interactive capabilities of the virtual content, locomotion of the virtual content, and/or other information.

The communication component may be configured to establish a wireless connection between the host device and a mobile computing platform that is separate and distinct from the host device. In some implementations, user interactions with the mobile computing platform may facilitate user interactions with the virtual content in the interactive space.

The relative position component may be configured to obtain relative position information. The relative position information may convey a position and/or heading of the mobile computing platform relative to a perceived position and/or heading of the virtual content.

The control component obtain user input information, and/or other information. The user input information may convey user entry and/or selection of one or more input elements of the mobile computing platform. The user entry and/or selection of the one or more input elements may comprise part of the user interactions with the mobile computing platform.

The control component may be configured to determine remote command information and/or other information. The remote command information may be configured to effectuate the user interactions with the virtual content in the interactive space based on the user interactions with the mobile computing platform. The remote command information may be determined based on one or more of the relative position information, the user input information, and/or other information.

The control component may be configured to control the one or more image-forming components based on the remote command information and/or other information. By way of non-limiting illustration, the one or more image-forming components may be controlled to cause the images of the virtual content to reflect the user interactions with the virtual content.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
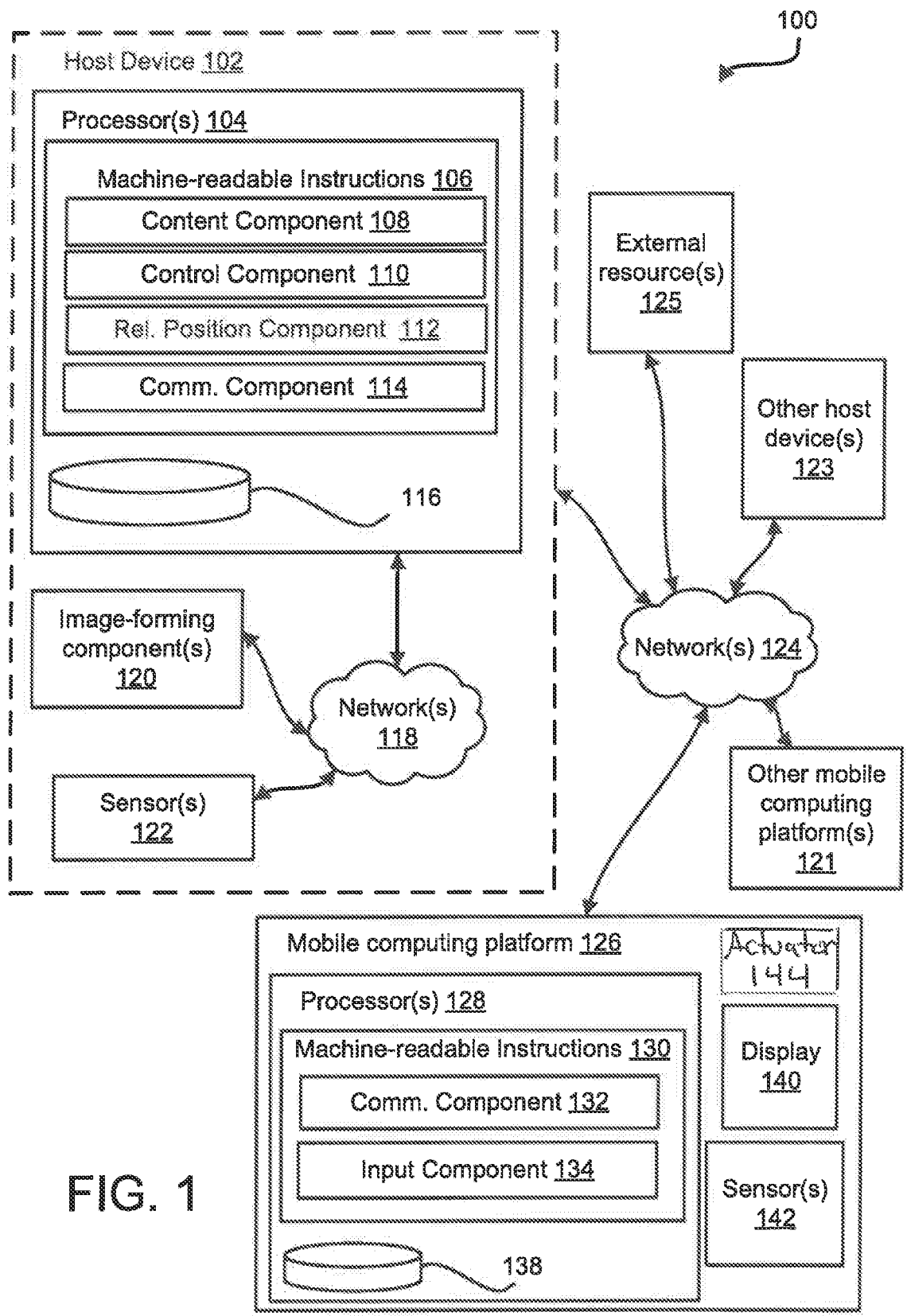
FIG. 1 illustrates a system configured to provide a mobile computing platform as a physical interface for an interactive space, in accordance with one or more implementations.

FIG. 1 shows a system 100 configured to provide a mobile computing platform as a physical interface for an interactive space, in accordance with one or more implementations. The interactive space may include one or more of an augmented reality environment, a virtual reality environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

Interactions with virtual objects in an interactive space may be dictated by hand movements and/or gestures. However, such hand-based interactions may be challenging. This may be due to precision of hand movements that may be required by users in order to carry out interactions and/or due to the intricacy of the virtual objects themselves. A mobile computing platform described herein may be configured to provide a handheld physical tool to interface with virtual objects in an interactive space and/or the system generally. Precision interactions with virtual objects and/or other interactions may be accomplished easily and intuitively via the mobile computing platform.

In some implementations, the mobile computing platform may act as a 3D controller and/or as a pointer to control a cursor for selecting virtual objects perceived to be present in the interactive space. For example, the sensors onboard the mobile computing platform may provide information indicating position and/or heading of the mobile computing platform in the real world. In some implementations, a sensor 142, such as an image sensor on a host device may recognize the mobile computing platform and determine its position and/or heading through image-based techniques. The cursor may act as an extension of the mobile computing platform; e.g., the user may point the mobile computing platform to where they want the cursor to go. The mobile computing platform may utilize existing and/or custom user interface elements/buttons to interact with the virtual objects. By way of non-limiting illustration, an existing and/or a custom keyboard may be used to input text into a virtual object (e.g., email, web browser, etc.). Custom user interface elements may allow for certain interactions with virtual objects. The interactions may include one or more of select, move, scale, rotate, change texture/color of virtual objects, resetting SLAM, surface scanning, and/or other types of interactions.

In FIG. 1, system 100 may include one or more of a host device 102, one or more other host devices 123, a mobile computing platform 126, one or more other mobile computing platforms 121, and/or other components. It is noted that while some descriptions herein may be directed to host device 102, this is for illustrative purposes only and is not to be considered limiting. For example, it is to be understood that individual ones of one or more other host devices 123 may be configured in the same or similar manner as host device 102. It is further noted that while some descriptions may be directed to mobile computing platform 126, this is for illustrative purposes only and is not to be considered limiting. For example, it is to be understood that individual ones of one or more other mobile computing platforms 121 may be configured in the same or similar manner as mobile computing platform 126.

In some implementations, one or more components of host device 102 may be included with and/or otherwise incorporated into host device 102. By way of non-limiting illustration, host device 102 may include and/or otherwise hold one or more of one or more physical processors 104, one or more image-forming components 120, one or more sensors 122, and/or other components. The host device 102 may be configured to be worn on a head of a user. By way of non-limiting illustration, host device 102 may include a headset such as one or more of a head-mounted display (HMD), glasses, goggles, and/or other devices.

In some implementations, one or more components of host device 102 may be included in one or more devices external to host device 102. For example, one or more components may be included in one or more of a desktop computer, a laptop computer, other mobile computer configurations, and/or other computing devices. By way of non-limiting illustration, one or more physical processors 104 and/or other components may be included in a mobile computing device external to host device 102 (not shown in FIG. 1). The host device 102 may be tethered and/or otherwise connected to the one or more external devices. Such connection may be wired (e.g., USB, HDMI, and/or other wired connections) and/or wireless (e.g., Bluetooth, Wi-Fi, and/or other wireless connections).

In FIG. 1, individual image-forming components of one or more image-forming components 120 may be configured to generate light rays to form images of virtual content. The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form and/or perceive coherent virtual content. As a result, the properties of the human perception may be exploited through visual systems, as described herein, employing hardware and/or software architectures to form virtual content (e.g., digital images) that may be located and/or perceived to be located in the real-world by virtue of neuroscience principles. For example, virtual content may be perceived as being present at a given position in the real-world. The virtual content may be perceived to have a particular heading and/or orientation based on a point of view in the interactive space from which the virtual content is being viewed.

Individual ones of one or more image-forming components 120 may include one or more of one or more light sources, one or more optical elements, and/or other components. In some implementations, an individual light source may be arranged on host device 102 to direct light rays toward one or more optical elements. The one or more image-forming components 120 may be configured such that images of virtual content may be superimposed over a view of the real world to create a view of the interactive space. In some implementations, images may be presented individually to each eye of the user as stereo image pairs.

A light source may comprise one or more of a microelectromechanical system (MEMS), RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

It is noted that the use of the term "light ray" is not intended to limit the scope of the disclosure to single, discrete, photons and/or packets of photons. Instead, the disclosure may envision a light ray to mean a light beam comprising multiple and/or continuous photons, in one or more implementations.

In some implementations, one or more optical elements of one or more image-forming components 120 may be arranged on host device 102 such that, when host device 102 is worn on the head of a user, the user's gaze may be directed toward the one or more optical elements. In some implementations, an optical element may form at least part of host device 102 through which a user may view the real world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials.

In some implementations, an optical element may comprise one or more of a waveguide, optical coupling features, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or both eyes of a user.

In some implementations, one or more optical elements of one or more image-forming components 120 may be arranged on host device 102 such that light rays generated by one or more light sources may be directed at the one or more optical elements, coupled into the one or more optical elements, and/or directed out of the one or more optical element into an eye of a user. The images of virtual content may be projected onto a retina of an eye such that the images may be superimposed over the user's view of the real world.

Figure 4:
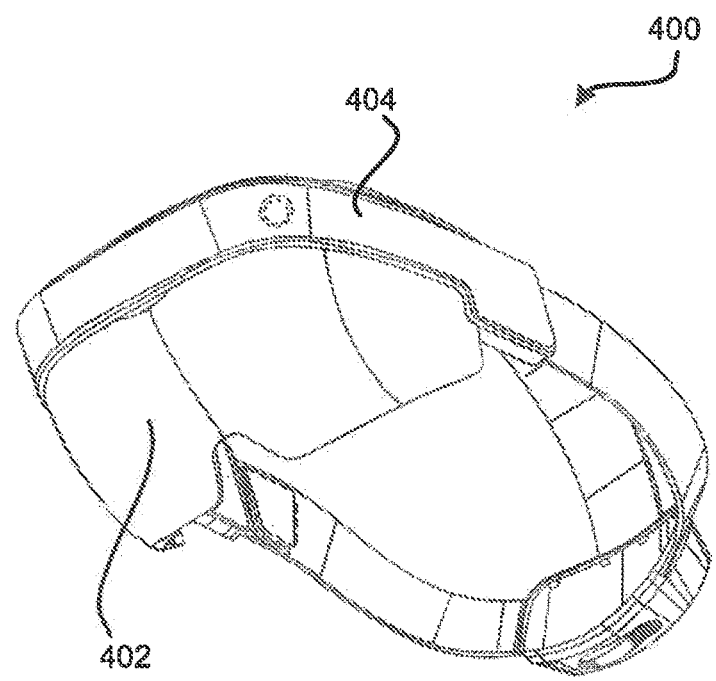
FIG. 4 illustrates an exemplary head-mounted display.

Referring now to FIG. 4, in some implementations, a headset (e.g., host device 102 in FIG. 1) may comprise an HMD 400. One or more components of system 100 (FIG. 1) may be held by, incorporated into, and/or otherwise comprise part of HMD 400. By way of non-limiting illustration, an optical element of an image-forming component may comprise at least part of a visor portion 402 of HMD 400. Components such as one or more of physical processors, light sources of image-forming components, one or more sensors, and/or other components may be incorporated into a housing portion 404 and/or other portions of HMD 400.

Figure 5:
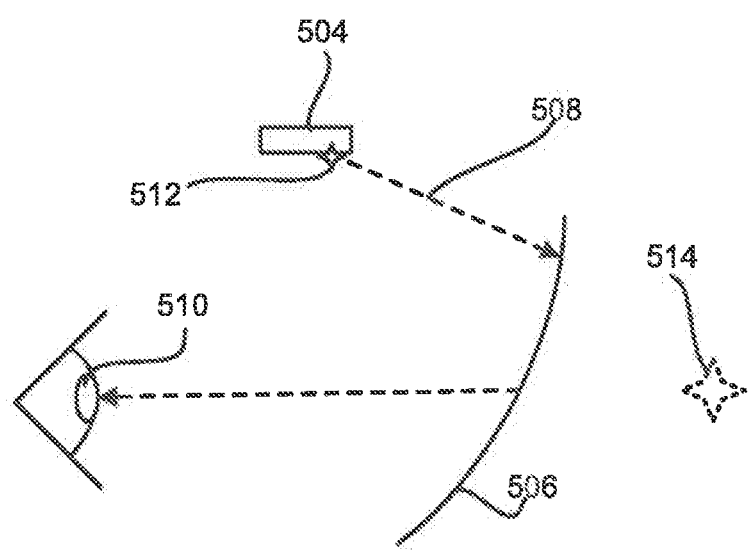
FIG. 5 illustrates a configuration of a light source and an optical element of an image-forming component, in accordance with one or more implementations.

FIG. 5 illustrates a configuration of a light source 504 and an optical element 506 of an image-forming component, in accordance with one or more implementations. The optical element may comprise, and/or may be part of, a visor portion of a headset. The light source 504 may be configured to emit light rays, including light ray 508. The light rays may form images, including image 512. The light rays may be received by optical element 506 and provided to an eye 510 of a user. The light rays received by eye 510 may form virtual content 514 (e.g., a virtual object) perceived to lie within three-dimensional space in the user's vision field or portion thereof.

Returning to FIG. 1, one or more sensors 122 of host device 102 may include one or more of a depth sensor, an image sensor, a position sensor, a heading sensor, and/or other sensors.

A depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, shape of an object, heading of a surface and/or object, and/or other information may be determined from depth information. In some implementations, a depth sensor may comprise one or more of a time-of-flight sensor, a structured light sensor, an unstructured light sensor, an active stereo pair, a passive stereo pair, and/or other depth sensing devices.

An image sensor may be configured to generate output signals conveying view information and/or other information. View information may specify visual content within a field of view of the image sensor. The visual content may include real-world objects and/or surfaces present in the real world. The view information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A position sensor may be configured to generate output signals conveying geo-position of the position sensor. A position sensor may include a global positioning system (GPS) and/or other position sensors.

A heading sensor may be configured to generate output signals conveying heading information and/or other information. The heading information may include orientation and/or heading. In some implementations, heading information may be specified with respect to one or more degrees of freedom. By way of non-limiting illustration, heading information may specify one or more of pitch angle, roll angle, and/or yaw angle of host device 102 over time. The heading sensor may include an inertial measurement unit (IMU) and/or others sensors. In some implementations, heading may be determined through image processing techniques utilizing the output signals conveying view information, and/or other techniques.

In FIG. 1, one or more of processor(s) 104, one or more image-forming components 120, one or more sensors 122, and/or other components of host device 102 may be operatively linked via one or more electronic communication links. For example, such electronic communication links may be established, at least in part, via network(s) 118. Network(s) 118 may comprise one or both of wired and/or wireless communications. It will be appreciated that this is not intended to be limiting and that the scope of this disclosure includes implementations in which one or more of processor(s) 104, one or more image-forming components 120, one or more sensors 122, and/or other components may be operatively linked via some other communication media.

In FIG. 1, mobile computing platform 126 may be a handheld device. The mobile computing platform 126 may include one or more of a mobile phone (e.g., smartphone), a tablet computing platform, and/or other devices. The mobile computing platform 126 may comprise one or more of one or more physical processors 128, a display 140, one or more sensors 142, haptic actuator 144 and/or other components.

The display 140 may be configured to present visual content. The visual content may be in the form of images, video, text, graphical user interfaces, and/or content. The display 140 may include one or more of a display screen, a touchscreen display, a projector display, and/or other devices configured to present content. A user interface presented on display 140 may be configured to facilitate interactions with virtual content of the interactive space (see, e.g., input component 134 and/or FIGS. 8-10).

In some implementations, individual sensors of one or more sensors 142 of mobile computing platform 126 may be the same as or similar to individual sensors of one or more sensors 122 of host device 102. By way of non-limiting illustration, one or more sensors 142 may include one or more of a depth sensor, an image sensor, a position sensor, a heading sensor, and/or other sensors.

In FIG. 1, one or more physical processors 104 of host device 102 may be configured by machine-readable instructions 106. Executing machine-readable instructions 106 may cause one or more physical processors 104 to facilitate providing a mobile computing platform as a physical interface for an interactive space. The machine-readable instructions 106 may include one or more of a content component 108, a control component 110, a relative position component 112 (abbreviated "Rel. Position Component 112" in FIG. 1), a communication component 114 (abbreviated "Comm. Component 114" in FIG. 1), and/or other components.

The content component 108 may be configured to obtain information defining virtual content. The information defining the virtual content may include information defining one or more of a visual appearance of the virtual content, one or more interactive capabilities of the virtual content, locomotion of the virtual content, and/or other information. The visual appearance of virtual content may include one or more of a two-dimension representation of the virtual content, a three-dimensional representation of the virtual content, a color of the virtual content, and/or other information. The interactive capabilities may refer to attributes related to ability of a user to manipulate the virtual content within the interactive space. Manipulation may be provided by input via mobile computing platform 126. The locomotion of the virtual content may refer to movement of virtual content in the interactive space.

The control component 110 may be configured to control individual ones of one or more image-forming components 120. Controlling an image-forming components 120 may include controlling one or more of one or more light sources, one or more optical elements, and/or other components.

One or more light sources may be controlled to generate light rays in accordance with virtual content to be presented to the user of host device 102 and/or other information. A light source may generate light rays to form a digital image, which when directed into a user's eyes, may be perceived as virtual content in three-dimensional space within the user's view of the real-world. The virtual content may be perceived by the viewing user to be present at a position within the real world. In some implementations, a user may interact with the virtual content via mobile computing platform 126 that may affect one or more aspects of the virtual content.

In some implementations, control component 110 may be configured to control individual ones of one or more image-forming components 120 based on one or more of user input information, remote command information, and/or other information (presented in more detail herein).

In some implementations, relative position component 112 may be configured to obtain relative position information and/or other information. The relative position component 112 may be configured to obtain relative position information by determining the relative position information and/or receiving the information from one or more sources. The relative position information may convey a position and/or heading of mobile computing platform 126 relative to perceived position and/or heading of virtual content. The relative position information may include one or more of a distance of a mobile computing platform 126 from virtual content, a heading of mobile computing platform 126 relative to virtual content, and/or other information.

In some implementations, determining the relative position information may comprise one or more of determining a principle axis of mobile computing platform 126, determining a principle direction of mobile computing platform 126 with respect to the principle axis, and/or other operations. In some implementations, the principle axis and/or principle direction of mobile computing platform 126 may dictate a pointing direction of mobile computing platform 126. For example, mobile computing platform 126 may act as a pointer to control a cursor for selecting virtual objects. In some implementations, the virtual cursor may be perceived as extending from the principle axis along the principle direction. The virtual cursor may be perceived as being positioned at a perceived intersection of the principle axis (along the principle direction) and a virtual object.

In some implementations, the principle axis may comprise a longitudinal centerline of mobile computing platform 126. In some implementations, the principle direction may comprise a direction that may commonly be understood as directed toward a "top" of mobile computing platform 126. For example, mobile computing platform 126 may comprise a smartphone and/or other device. The smartphone and/or other device may have a conventional orientation when in use, e.g., the top of may be distinguishable from the bottom. The principle direction may extend from the bottom to the top.

Figure 6:
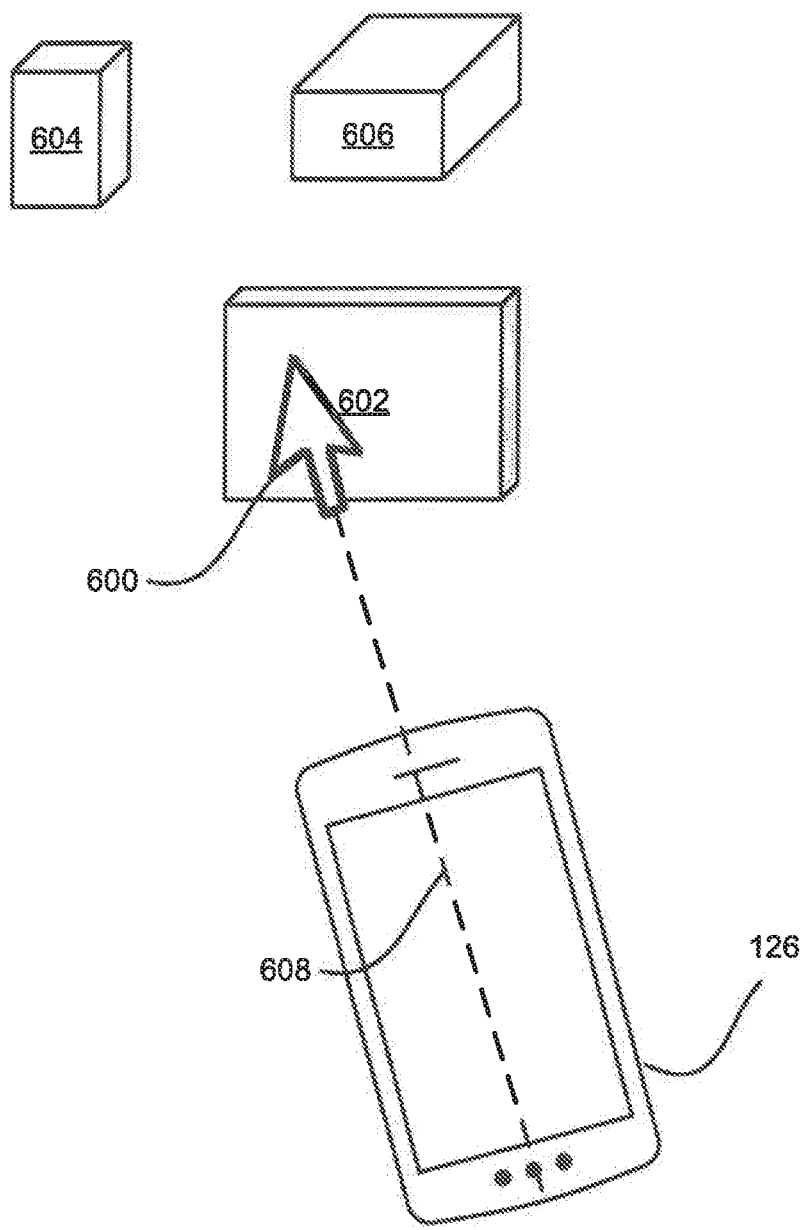
FIG. 6 illustrates an implementation of the system of FIG. 1 showing a view of an interactive space including a set of virtual objects and a mobile computing platform providing a physical interface for the interactive space.

By way of non-limiting illustration, FIG. 6 illustrates a view of an interactive space. The interactive space may include a set of virtual objects, a virtual cursor 600, and/or mobile computing platform 126 providing a physical interface for the interactive space. The set of virtual objects may include one or more of a first virtual object 602, a second virtual object 604, a third virtual object 606, and/or other virtual objects. The mobile computing platform 126 may include a display surface 126a and a principle axis 608. The dashed line representing principle axis 608 may be an imaginary line and/or may be shown as a virtual object within the interactive space. The principle axis 608 may comprise a longitudinal centerline of mobile computing platform 126. The cursor 600 may act as an extension of mobile computing platform 126 and may be perceived to be present at an intersection of principle axis 608 and first virtual object 602.

Figure 7:
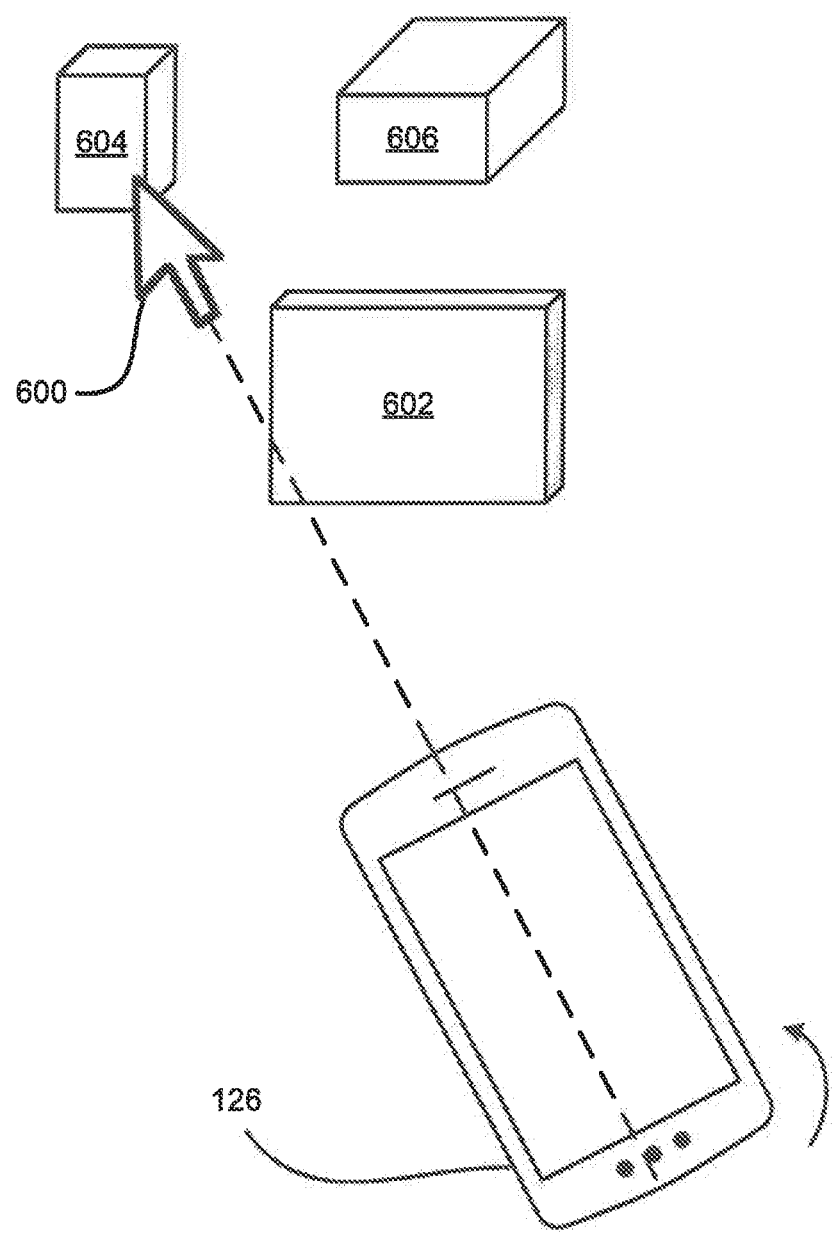
FIG. 7 illustrates an implementation of the system of FIG. 1 showing a view of an interactive space including a set of virtual objects and a mobile computing platform providing a physical interface for the interactive space.

FIG. 7 shows how user interactions with mobile computing platform 126 may facilitate selection of other virtual objects, such as second virtual object 604. For example, mobile computing platform 126 acting as a pointing device may allow a user to point to a desired virtual object to convey a selection of that virtual object. The user interactions with mobile computing platform 126 may include one or more of moving mobile computing platform 126, rotating mobile computing platform 126, and/or other interactions.

Returning to FIG. 1, in some implementations, relative position component 112 of host device may be configured to determine relative position information and/or other information. The relative position information may be determined based on output signals from one or more sensors and/or 142 and/or other sources of information.

In some implementations, relative position information may be determined by relative position component 112 based on depth information conveyed by output signals from a depth sensor of host device 102 and/or other information. The depth information may include a point cloud and/or other information. Presence of mobile computing platform 126 may be determined from the point cloud based on recognition of size and/or shape of mobile computing platform 126 within the point cloud. The position and/or heading of mobile computing platform 126 may be determined from the point cloud. By way of non-limiting illustration, one or more detection and/or recognition techniques may be utilized to recognize and/or detection the shape and/or form of mobile computing platform 126 within a point cloud.

In some implementations, the position and/or heading of mobile computing platform 126 may be determined relative to one or more of host device 102, the depth sensor, and/or other reference points. The position and/or heading of mobile computing platform 126 relative to virtual content perceived to be present in the real-world may be determined based on the perceived position and/or heading of virtual content and the determined position and/or heading of mobile computing platform 126. For example, the position and/or heading of mobile computing platform 126 and the perceived position and/or heading of virtual content may be determined with respect to the same reference point (e.g., one or more of host device 102, one or more sensors 122, and/or other reference). Accordingly, the position and/or heading of mobile computing platform 126 relative to the perceived position and/or heading of virtual content may be determined and/or computed using conventional geometric considerations, and/or other techniques.

In some implementations, relative position information may be determined by relative position component 112 based on view information conveyed by output signals of an image sensor of host device 102, and/or image sensors on walls or other fixed positions in the interactive space (i.e., "outside-in" external devices capable of tracking the position and/or movement of mobile computing platform 126). The view information may define images and/or video. Presence of the mobile computing platform 126 may be determined from the view information using one or more image processing techniques, such as techniques in computer vision. The position and/or heading of mobile computing platform 126 relative to one or more references may be determined and/or tracked within images and/or video using one or more image processing techniques. The one or more image processing techniques may include object detection, bundle adjustment, and/or other computer vision techniques. The position and/or heading of mobile computing platform 126 relative to virtual content perceived to be present in the real-world may be determined based on the perceived position and/or heading of virtual content and the determined position and/or heading of mobile computing platform 126.

In some implementations, relative position information may be determined by relative position component 112 based on information received from mobile computing platform 126 and/or other information. The information received from mobile computing platform 126 may include one or more of output signals from a heading sensor of mobile computing platform 126 conveying heading information, output signals from a position sensor of mobile computing platform 126 conveying position information, and/or other information. This position sensor may include one or more of one or more cameras or image sensors of the mobile computing platform 126, and/or one or more inertial measurement units (IMUs) and/or other position and/or movement-bases sensors of the mobile computing platform 126 (i.e., "inside-out" internal devices capable of tracking the position and/or movement of mobile computing platform 126). The relative position component 112 may utilize the conveyed heading of mobile computing platform and/or conveyed position of mobile computing platform 126 to determine one or more of a heading of mobile computing platform 126 relative to perceived heading of virtual content, a position of mobile computing platform 126 relative to perceived position of virtual content, and/or other information.

The communication component 114 may be configured to establish a connection between host device 102 and mobile computing platform 126. The connection may be established over network 124 and/or other communications network. The connection may include a wired and/or wireless connection.

The communication component 114 may be configured to effectuate communication of information to, and/or receive information from, mobile computing platform 126.

The control component 110 may be configured to obtain user input information and/or other information. The user input information may convey user entry and/or selection of one or more input elements of the mobile computing platform. The user entry and/or selection of the one or more input elements may comprise part of user interactions with mobile computing platform 126 that may facilitate interactions with virtual content in an interactive space. The user input information may be received and/or retrieved from mobile computing platform 126. The user input information may be determined by input component 134 of mobile computing platform 126. In some implementations, the user input information may comprise the interactions and/or actions that may be applied to selected virtual content. By way of non-limiting illustration, individual input elements may correspond to individual interactions and/or actions within the interactive space. The interactions may include one or more of move, scale, rotate, change texture/color of virtual objects, and/or other types of interactions. The actions may include one or more of resetting a map of the real-world environment, surface scanning, and/or other actions. The map may be provided by simultaneous localization and mapping (SLAM) computations that construct and/or update the map of the environment while simultaneously keeping track of location of the host device 102. Surface scanning may refer to scanning a surface to understand a topography of the surface and/or other information about the surface. Other interactions and/or actions may be carried out.

The control component 110 may be configured to determine remote command information and/or other information. The remote command information may be configured to effectuate user interactions with virtual content in the interactive space based on user interactions with mobile computing platform 126. In some implementations, the remote command information may include information conveying one or more of a selection of virtual content (e.g., via pointing mobile computing platform 126), interactions and/or actions to apply to the selected virtual content (e.g., via user entry and/or selection of input elements of mobile computing platform 126), instructions to one or more image-forming component 120 to control one or more image-forming component 120 to reflect the interactions and/or actions applied to the selected virtual content, and/or other information. The remote command information may be determined based on one or more of relative position information, user input information, and/or other information. For example, it will be readily apparent to a person of ordinary skill in the art that any combination of "outside-in" external sensor devices and "inside-out" internal sensor devices may be employed by one or more of relative position component 112 and control component 110 to determine relative position information and/or remote command information, respectively.

In some implementations, determining the remote command information may comprise determining, based on relative position information and/or other information, a perceived selection of virtual content, such as an individual virtual object and/or group of virtual objects. In some implementations, selecting virtual content may be determined based on one or more of a principle axis of mobile computing platform 126, a principle direction of mobile computing platform 126 with respect to the principle axis, virtual content perceived to intersect with the principle axis along the principle direction, and/or other information. In some implementations, the virtual content perceived to intersect with the principle axis along the principle direction may convey a selection of that virtual content.

In some implementations, selection of virtual content may be facilitated by a virtual cursor. The virtual cursor may provide a visual indication of where mobile computing platform 126 may be pointing with respect to principle direction of the principle axis. The control component 110 may be configured to control one or more image-forming components 120 to generate light rays forming an image of the virtual cursor. The image of the virtual cursor may be configured such that the virtual cursor may be perceived as being positioned at the perceived intersection of the principle axis along the principle direction and virtual content. The image of the virtual cursor may be configured such that the virtual cursor may track with the movement of mobile computing platform 126.

In some implementations, determining the remote command information may comprise determining, based on the user entry and/or selection of the one or more input elements of mobile computing platform 126, an interaction with the selected virtual object in the interactive space and/or an action to carry out in the interactive space.

The control component 110 may be configured to control one or more image-forming components 120 based on the remote command information and/or other information. The one or more image-forming components 120 may be controlled to cause images of virtual content to reflect the user interactions with the virtual content.

In FIG. 1, one or more physical processors 128 of mobile computing platform 126 may be configured by machine-readable instructions 130. Executing machine-readable instructions 130 may cause one or more physical processors 128 to facilitate providing a mobile computing platform as a physical interface for an interactive space. The machine-readable instructions 130 may include one or more of a communication component 132 (abbreviated "Comm. Component 132" in FIG. 1), an input component 134, and/or other components.

The communication component 132 may be configured to establish a connection between host device 102 and mobile computing platform 126. The connection may be established over network 124 and/or other communications network. The connection may include a wired and/or wireless connection.

The communication component 132 may be configured to effectuate communication of information to, and/or receive information from, host device 102.

The input component 134 may be configured to obtain output signals from individual sensors of one or more sensors 142. By way of non-limiting illustration, input component 134 may be configured to obtain output signals conveying position information, heading information, and/or other information from one or more sensors 142. The position information may convey a position of mobile computing platform 126. The heading information may convey a heading of the mobile computing platform 126.

The input component 134 may be configured to obtain user input information. The user input information may be obtained by determining the user input information based on user entry and/or selection of one or more input elements of mobile computing platform 126. The user input information may convey the user entry and/or selection of one or more input elements of the mobile computing platform 126. The user entry and/or selection of the one or more input elements may comprise part of the user interactions with the mobile computing platform 126 that are used to determined interactions with virtual content.

In some implementations, input component 134 may be configured to effectuate presentation of one or more graphical user interfaces on display 140 of mobile computing platform 126. A user interface may include one or more input elements configured for user entry and/or selection. An individual input element may correspond to one or more interactions with virtual objects and/or actions within the interactive space. By way of non-limiting illustration, a first input element may correspond to performing a color change, a second input element may correspond to performing a scaling operation, a third input element may correspond to providing text input (e.g., a keyboard), and/or other input elements may correspond to other interactions. An individual input element may include one or more of a virtual button, a slider bar, a check box, a drop-down menu, a keyboard, a text input bar, and/or other elements. Once a virtual object is selected (e.g., by pointing mobile computing platform 126), one or more input elements may be selected to effectuate one or more interactions with the selected virtual object.

Figure 8:
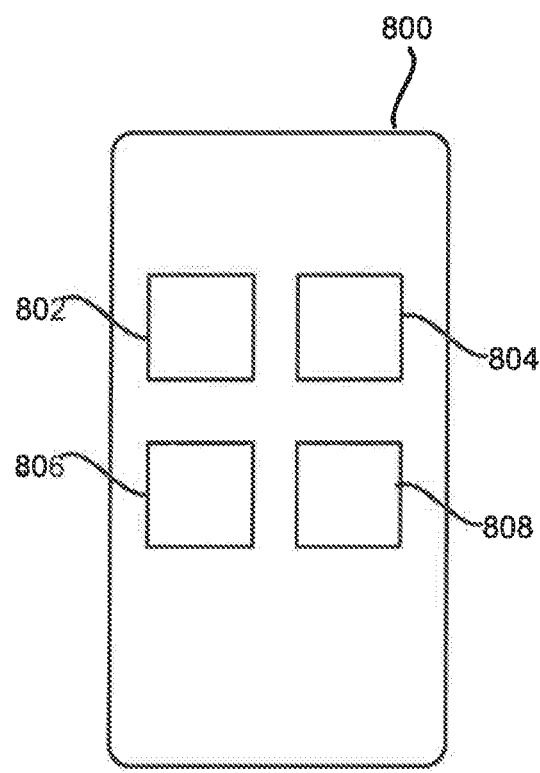
FIG. 8 illustrates an exemplary user interface presented on a display of a mobile computing platform configured as a physical interface with an interactive space.
Figure 9:
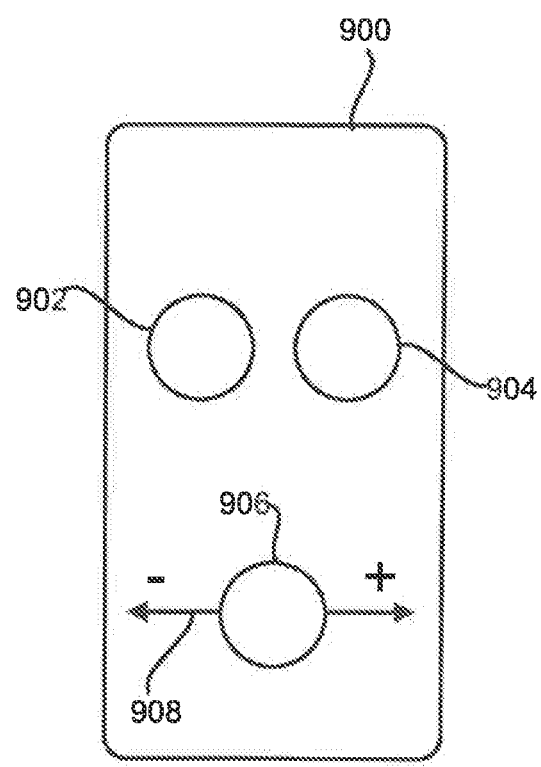
FIG. 9 illustrates an exemplary user interface presented on a display of a mobile computing platform configured as a physical interface with an interactive space.
Figure 10:
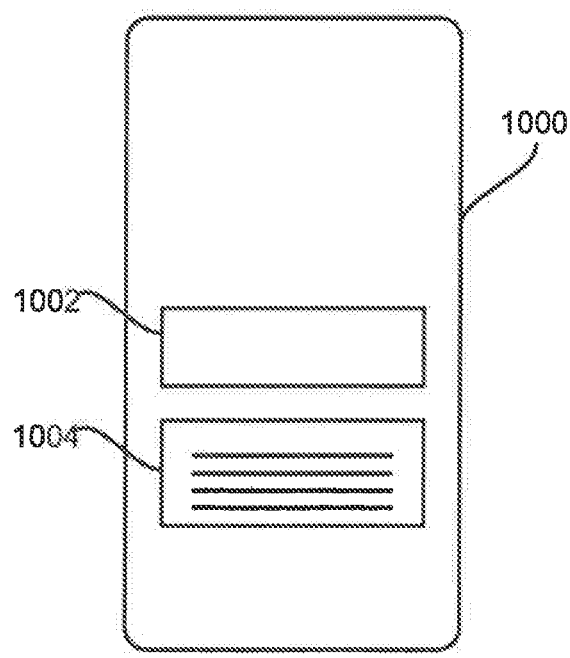
FIG. 10 illustrates an exemplary user interface presented on a display of a mobile computing platform configured as a physical interface with an interactive space.

FIGS. 8-10 illustrate examples of user interfaces presented on a display of a mobile computing platform configured as a physical interface with an interactive space. An individual user interface may include one or more input elements.

In FIG. 8, a user interface 800 is shown. The user interface 800 may include a grid of user interface elements. The grid of user interface elements may include one or more of a first user interface element 802, a second user interface element 804, a third user interface element 806, a fourth user interface element 808, and/or other user interface elements. An individual user interface element may be formed as a square virtual button, and/or may have other shapes.

In FIG. 9, user interface 900 is shown. The user interface 900 may one or more of a first user interface element 902, a second user interface element 904, a third user interface element 906, and/or other user interface elements. The first user interface element 902 and/or second user interface element 904 may be formed as circular virtual buttons and/or may have other shapes. The third user interface element 906 may be a slider user interface element. The third user interface element 906 may comprise a virtual button that may be slide along slider bar 908. Interactions with third user interface element 906 may provide for increases and/or decreases of an aspect of a virtual object. By way of non-limiting illustration, the slider mechanism may facilitate increasing and/or decreasing a size (or scale) of a virtual object, brightness, color tone, and/or other aspects.

In FIG. 10, user interface 1000 is shown. The user interface 1000 may include one or more of a first user interface element 1002, a second user interface element 1004 and/or other user interface elements. The first user interface element 1002 may comprise a text viewing window. The second user interface element 1004 may comprise a keyboard. Inputs into second user interface element 1004 may be reflected on a selected virtual object and/or within first user interface element 1002 as a reference.

Returning to FIG. 1, host device 102, one or more other host devices 123, mobile computing platform 126, one or more other mobile computing platforms 121, external resource(s) 125, and/or other components may be operatively linked via one or more electronic communication links. For example, such electronic communication links may be established, at least in part, via network(s) 124.

Network(s) 124 may comprise one or both of wired and/or wireless communications (e.g., Bluetooth, Wi-Fi, etc.). It will be appreciated that this is not intended to be limiting and that the scope of this disclosure includes implementations in which one or more of host device 102, one or more other host devices 123, mobile computing platform 126, one or more other mobile computing platforms 121, external resource(s) 125, and/or other components may be operatively linked via some other communication media. In some implementations, network(s) 118 may be the same as network(s) 124 or the networks may be separate and distinct networks.

The external resource(s) 125 may include sources of information, hosts, external entities participating with system 100, providers of virtual content, and/or other resources. In some implementations, some or all of the functionality attributed herein to external resource(s) 125 may be provided by resources included in system 100.

The processor(s) 104 may include and/or have access to electronic storage 116, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

The electronic storage 116 may comprise non-transitory electronic storage media that electronically stores information. The electronic storage 116 may store machine-readable instructions 106. The electronic storage media of electronic storage 116 may include one or both of system storage that is provided integrally (i.e., substantially non-removable) with processor(s) and/or removable storage that is removably connectable to processor(s) 104 via, for example, a port or a drive. A port may include a USB port, a FIREWIRE port, and/or other ports. A drive may include a disk drive and/or other drives. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 104, information received from other components of system 100, and/or other information that enables processor(s) 104 to function as described herein.

Processor(s) 104 is configured to provide information-processing capabilities for host device 102. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, and/or other components. Processor(s) 104 may be configured to execute component 108, 110, 112, 114, and/or other components by software; hardware; firmware; some combination of software, hardware, and/or firmware; and/or other mechanisms for configuring processing capabilities on processor(s) 104.

It should be appreciated that although components 108, 110, 112, and 114 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, 112, 114, and/or other components.

The processor(s) 128 of mobile computing platform 126 may include and/or have access to electronic storage 138, and/or other components. The processor(s) 128 may include communication lines or ports to enable the exchange of information with a network and/or other components of system 100. Illustration of processor(s) 128 in FIG. 1 is not intended to be limiting. The processor(s) 128 may include a plurality of hardware, software, and/or firmware components operating together to provide the functionality attributed herein to processor(s) 128. For example, processor(s) 128 may be implemented by a cloud of computing platforms operating together as processor(s) 128.

The electronic storage 138 may comprise non-transitory electronic storage media that electronically stores information. By way of non-limiting illustration, electronic storage 138 may store machine-readable instructions 130. The electronic storage media of electronic storage 138 may include one or both of system storage that is provided integrally (i.e., substantially non-removable) with processor(s) 128 and/or removable storage that is removably connectable to processor(s) 128 via, for example, a port or a drive. A port may include a USB port, a FIREWIRE port, and/or other ports. A drive may include a disk drive and/or other drives. The electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 138 may include one or more virtual storage resources (e.g., cloud storage, a virtual private network, and/or other virtual storage resources). The electronic storage 138 may store software algorithms, information determined by processor(s) 128, information received from other components of system 100, and/or other information that enables processor(s) 128 to function as described herein.

Processor(s) 128 is configured to provide information-processing capabilities in mobile computing platform 126. As such, processor(s) 128 may include one or more of a physical processor, a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include one or more processing units. These processing units may be physically located within the same device, or processor(s) 128 may represent processing functionality of a plurality of devices operating in coordination. The processor(s) 128 may be configured to execute components 132, 134, and/or other components. Processor(s) 128 may be configured to execute component 132, 134, and/or other components by software; hardware; firmware; some combination of software, hardware, and/or firmware; and/or other mechanisms for configuring processing capabilities on processor(s) 128.

It should be appreciated that although components 132 and/or 134 are illustrated in FIG. as being co-located within a single processing unit, in implementations in which processor(s) includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 128 may be configured to execute one or more additional components that may perform some or all of the functionality attributed to individual ones of components 132, 134, and/or other components.

Figure 2:
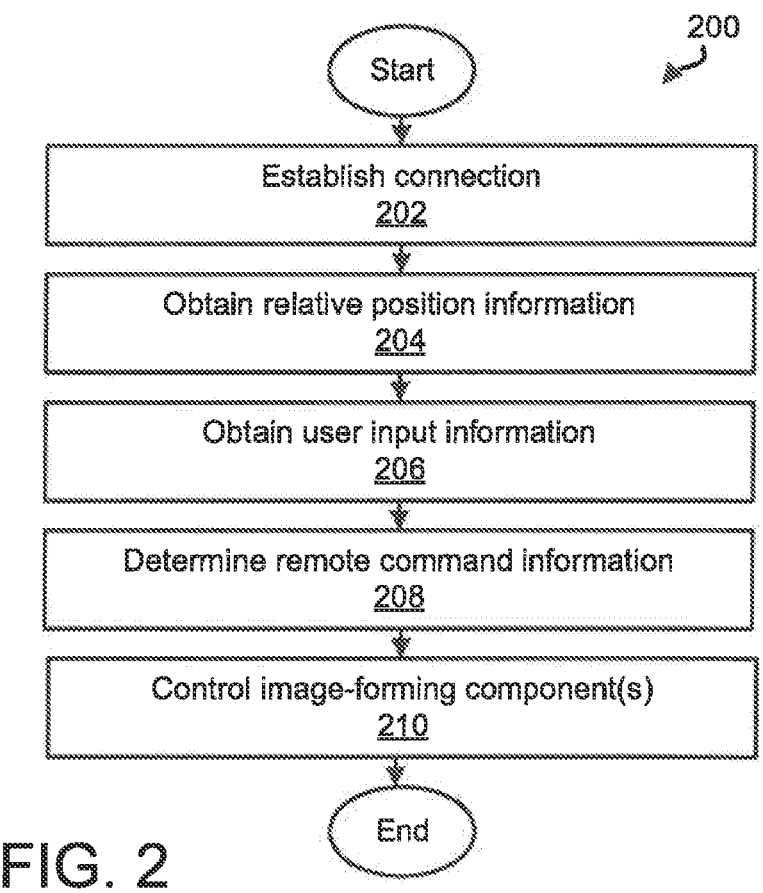
FIG. 2 illustrates a method to provide a mobile computing platform as a physical interface for an interactive space, in accordance with one or more implementations.
Figure 3:
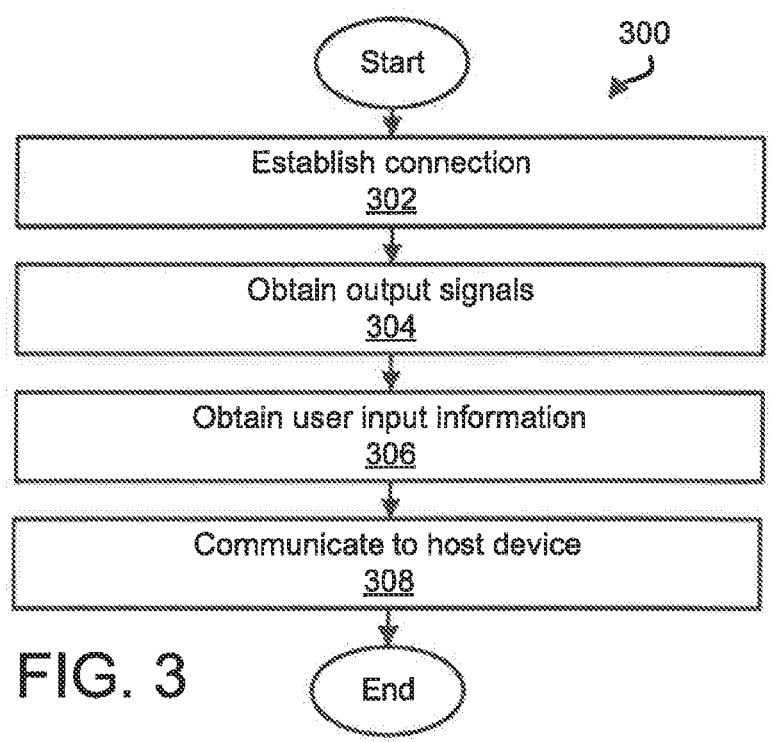
FIG. 3 illustrates a method to provide a mobile computing platform as a physical interface for an interactive space, in accordance with one or more implementations.

FIG. 2 and FIG. 3 illustrate methods 200 and 300, respectively, to provide a mobile computing platform as a physical interface for an interactive space, in accordance with one or more implementations. The operations of individual ones of method 200 and/or method 300 presented below are intended to be illustrative. In some implementations, method 200 and/or method 300 may be accomplished with one or more additional operations not described, and/or without one or more of the operations discussed. Additionally, the order in which the operations of method 200 and method 300 are illustrated in FIG. 2 and FIG. 3, respectively, and described below is not intended to be limiting.

In some implementations, method 200 and/or method 300 may be implemented in and/or using a system, such as system 100 shown in FIG. 1, and described herein. By way of non-limiting illustration, method 200 may be implemented by one or more physical processes the same as or similar to one or more physical processor 104 of host device 102 in FIG. 1. By way of non-limiting illustration, method 300 may be implemented by one or more physical processors the same as or similar to one or more physical processors 128 of mobile computing platform 126 in FIG. 1. The one or more physical processors may include one or more devices executing one or more of the operations of method 200 and/or method 300, respectively, in response to instructions stored electronically on electronic storage media. The one or more processing devices may include one or more devices configured through hardware, firmware, and/or software to be specifically designed for execution of one or more of the operations of method 200 and/or method 300.

Referring to method 200 in FIG. 2, at an operation 202, a wireless connection between a device and a mobile computing platform may be established. The mobile computing platform may be separate and distinct from the device. The device may be configured to be worn on a head of a user. The device may include one or more image-forming components and/or other components. The one or more image-forming components may be configured to generate light rays to form images of virtual content. The one or more image-forming components may be configured to present the images to the user and superimpose the images over views of the real world to create an interactive space. The virtual content may be perceived to be present in the real world. User interactions with the mobile computing platform may facilitate user interactions with the virtual content in the interactive space. In some implementations, operation 202 may be performed by one or more physical processors executing a communication component the same as or similar to communication component 114 (shown in FIG. 1 and described herein).

At an operation 204, relative position information may be determined. The relative position information may convey a position and/or heading of the mobile computing platform relative to a perceived position and/or heading of the virtual content. In some implementations, operation 204 may be performed by one or more physical processors executing a relative position component the same as or similar to relative position component 112 (shown in FIG. 1 and described herein).

At an operation 206, user input information may be obtained. The user input information may convey user entry and/or selection of one or more input elements of the mobile computing platform. The user entry and/or selection of the one or more input elements may comprise part of the user interactions with the mobile computing platform. In some implementations, operation 206 may be performed by one or more physical processors executing a communication component the same as or similar to communication component 114 (shown in FIG. 1 and described herein).

At an operation 208, remote command information may be determined. The remote command information may be determined based on one or more of relative position information, user input information, and/or other information. The remote command information may be configured to effectuate the user interactions with the virtual content in the interactive space based on the user interactions with the mobile computing platform. In some implementations, operation 208 may be performed by one or more physical processors executing a control component the same as or similar to control component 110 (shown in FIG. 1 and described herein).

At an operation 210, the one or more image-forming components may be controlled based on the remote command information and/or other information. By way of non-limiting illustration, the one or more image-forming components may be controlled to cause the images of the virtual content to reflect the user interactions with the virtual content. In some implementations, operation 210 may be performed by one or more physical processors executing a control component the same as or similar to control component 110 (shown in FIG. 1 and described herein).

Referring to method 300 in FIG. 3, at an operation 302, a wireless connection between a device and a mobile computing platform may be established. The mobile computing platform may be separate and distinct from the device. The device may be configured to be worn on a head of a user. The device may include one or more image-forming components and/or other components. The one or more image-forming components may be configured to generate light rays to form images of virtual content. The one or more image-forming components may be configured to present the images to the user and superimpose the images over views of the real world to create an interactive space. The virtual content may be perceived to be present in the real world. User interactions with the mobile computing platform may facilitate user interactions with the virtual content in the interactive space.

In some implementations, operation 302 may be performed by one or more physical processors executing a communication component the same as or similar to communication component 132 (shown in FIG. 1 and described herein).

When virtual content is superimposed over the display 140 of the mobile computing platform while the display is idle and black in color, the display will essentially appear to be invisible to the user (appearing like a piece of glass or window into the virtual world). On the other hand, when images are rendered in a non-black color on the display 140 (or are fixed on other portions of the mobile computing platform 126), these elements may add to the user's perception of the virtual content (for example, by creating a 2D floating element and/or 3D element in virtual space). This shared or composite rendering of virtual content may advantageously, for example, integrate high resolution and tactility features of the mobile computing platform with an extended field-of-view (FOV) as provided within the interactive space generated by the host device 102.

At an operation 304, output signals conveying position information and/or heading information may be obtained. The position information and/or heading information may convey a position and/or heading of the mobile computing platform. In some implementations, operation 304 may be performed by one or more physical processors executing an input component the same as or similar to input component 134 (shown in FIG. 1 and described herein).

At an operation 306, user input information may be obtained. The user input information may convey user entry and/or selection of one or more input elements of the mobile computing platform. The user entry and/or selection of the one or more input elements may comprise part of the user interactions with the mobile computing platform. In some implementations, operation 306 may be performed by one or more physical processors executing an input component the same as or similar to input component 134 (shown in FIG. 1 and described herein).

At an operation 308, communication may be effectuated of the output signals, the user input information, and/or other information to the device. The device may utilize the output signals, the user input information, and/or other information to control the one or more image-forming components to cause the images of the virtual content to reflect the user interactions with the virtual content. In some implementations, operation 308 may be performed by one or more physical processors executing a communication component the same as or similar to communication component 132 (shown in FIG. 1 and described herein).

Referring again to FIGS. 6 and 7, it should be readily understood that the depicted principle axis 608 of the mobile computing platform 126 extending along a center line from bottom to top of the mobile computing platform 126 is for illustration purposes only and that a principle axis in accordance with this disclosure may extend along or through any axis intersecting the mobile computing device 126, including within the plane of, or perpendicular to, any external surface or volume therebetween of the mobile computing platform 126. For example, a suitable principle axis may extend perpendicular to a display surface 126a of the mobile computing platform 126 with the heading being, for example, in a direction extending outward of a surface disposed opposite to the display surface 126a of the mobile computing platform 126 to enable the user to point to and interact with virtual objects by orienting the mobile computing platform 126, e.g., mobile telephone, in an orientation conventionally used for capturing video or images with an image sensor 142, disposed on the surface opposite the display surface 126a in such mobile computing platform 126.

Further, for FIGS. 8-10 it should be readily understood that the user interface elements, e.g., interface elements 80X, 90X, 100X, presented on display 140 of the mobile computing platform 126 to facilitate interactions by the user with virtual content projected in the interactive space may be produced by, for example, a software application or app stored in the memory 138 and executed by the processor 128, shown in FIG. 1, of such mobile computing platform 126. Such software application or app may also depict different selectable interface elements, e.g., elements 80X, 90X, 100X, based on, for example, movement and/or changes in orientation or heading of such mobile computing platform 126 relative to the location of one or more virtual objects in the interactive space, alone or in combination with prior displayed interface elements selected, deselected, activated and/or deactivated, by the user.

Referring to FIG. 1, the processor(s) 128 of the mobile computing platform 126 may also control a haptic actuator 144 to selectively vibrate or provide other types of haptic feedback to the user based on the occurrence of particular events including, for example, when the principle axis of the mobile computing platform 126 is at a heading or oriented for selection or deselection of a virtual object displayed in the interactive space, such as the virtual object 604 depicted in FIG. 7, to confirm selection or deselection of such virtual object 604, or provide an alert concerning remote command information or the occurrence of other events.

In addition, if the mobile computing platform 126 includes an image sensor 142 of FIG. 1, it would be advantageous to use the image sensor 142 to facilitate determination of the physical orientation or heading of the based on processing of captured images of the real-world environment relative to a known position of the mobile computing platform 126 or otherwise. The use of such captured images by the processor 128 may be employed alone or in combination with other techniques for determination of the physical orientation or heading including, for example, gyroscopic or angle determination techniques.

Figure 11:
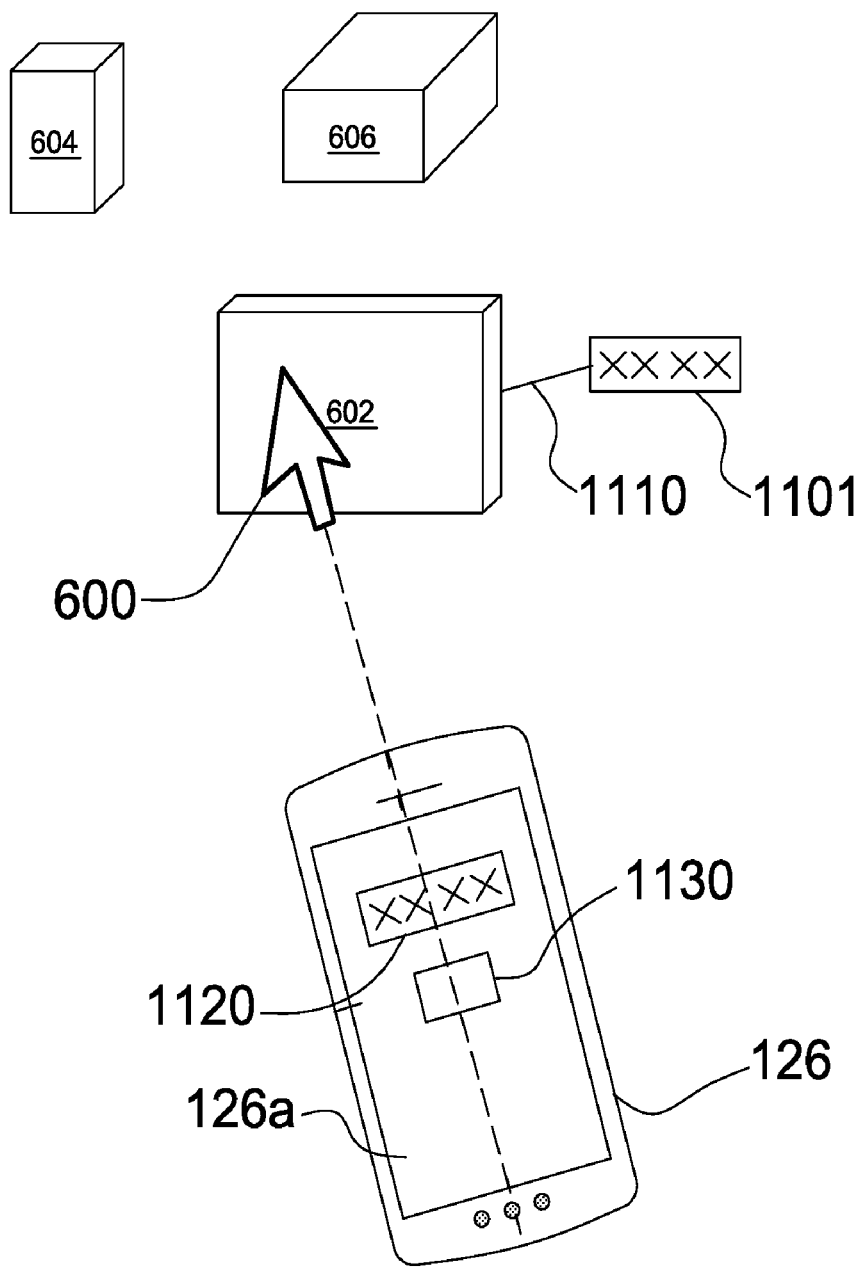
FIG. 11 illustrates an exemplary user interface presented on a display of a mobile computing platform configured as a physical interface for associating graphic images with real-world or virtual objects with an interactive space.

FIG. 11 depicts an exemplary operation of the mobile computing platform 126 for causing the generation of particular graphic information 1101 of, for example, virtual images, such as alphanumeric, emoji, images or video, to selectively be associated with an object, such as virtual object 602. Such association may be represented by projection of, for example, a corresponding leader line 1110. In accordance with one exemplary operation for generating and associating a graphical image with an object, e.g., virtual object 602, the user would position the mobile computing platform 126 so as to select using, for example, virtual cursor 600 according to one of the object selection techniques described herein or otherwise. The user further enters graphic image information the mobile computing platform 126 by, for example, interface element 1120 displayed on the display 126a, such entered information being indicative of the graphic image that the user desires to associate with the virtual object 602. Upon completion of the information entry and selection of the object to which to associate the corresponding graphic information, the user selects the appropriate interface element 1130 to execute an association step wherein the graphic information 1101 is projected as a virtual image in the interactive space proximate the virtual object 602, preferably with a leader line projected therebetween. It is alternatively possible in accordance with this disclosure to associate the graphic image with a real-world object (not shown) instead of the virtual object 602 located within the interactive space. Further, the graphic image 1101 may be associated with the intended object without the use of the leader line 1110, by using, example, dashed lines, corresponding line projections, or identical or complementary colors of the graphic image (or a border surrounding at least a part of the graphic image) and/or the associated object image (or a border surrounding at least a part of the object), or the use of some other association indicator.

Figure 12A:
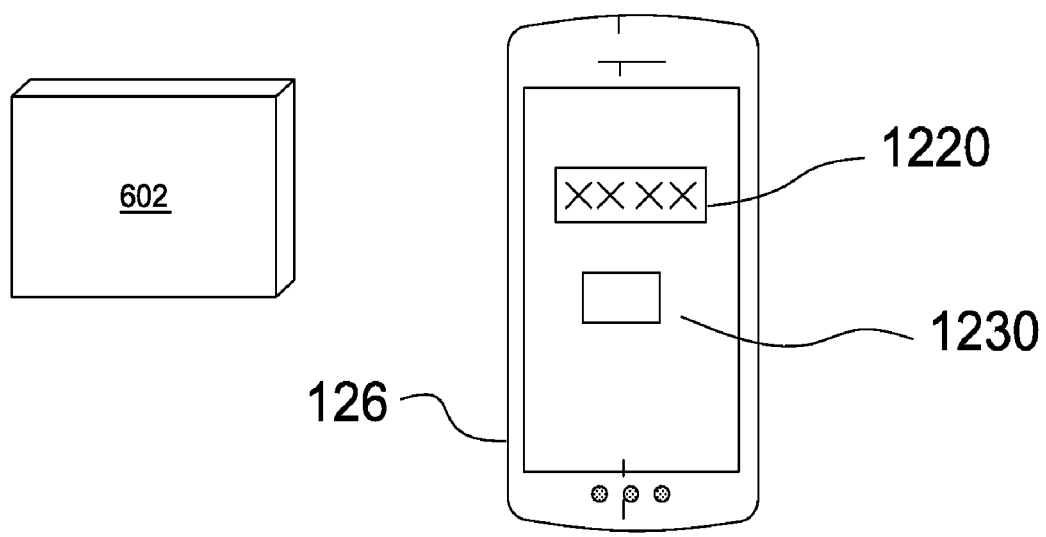
FIGS. 12a and 12b illustrates another exemplary user interface presented on a display of a mobile computing platform configured as a physical interface for associating graphic images with real-world or virtual objects with an interactive space
Figure 12B:
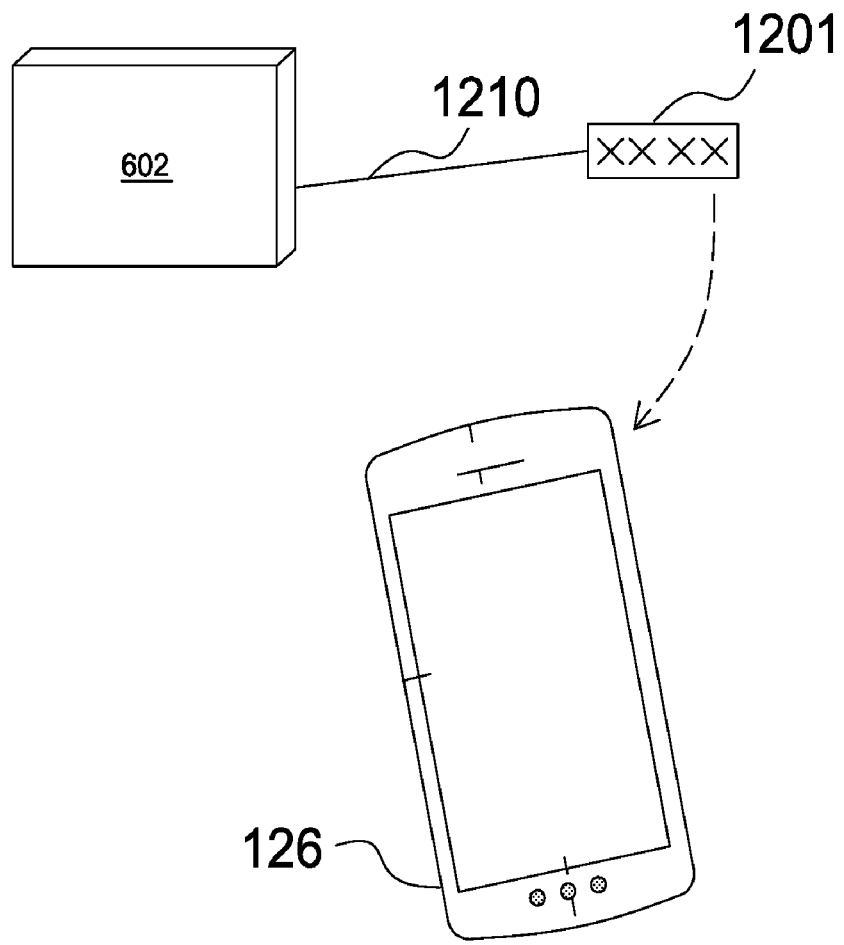

FIGS. 12a and 12b depict another exemplary operation of the mobile computing platform 126 for causing the generation of particular graphic information 1201 as a virtual image that may be selectively associated with an object, such as virtual object 602 as depicted in FIGS. 12a and 12b. The association may be determined, for example, by determining that a distance between the virtual object 602 and mobile computing platform 126 lies below a predetermined threshold.

As illustrated in FIG. 12b, the association may be represented, for example, by projecting a corresponding virtual leader line 1210 between the virtual object 602 and graphic information 1201. In this operation, as shown in FIG. 12a, the mobile computing platform 126 is not used to project the graphical image 1201 to a position indicated by a virtual cursor 600 as shown in FIG. 11, but rather is positioned by the user such that the location of the graphic information 1201 on the display surface 126a coincides with a location in the interactive space at which the graphic information 1201 appears. Once the mobile computing platform 126 is positioned to place the graphic information 1201 at this location, the user may select interface element 1230 as shown in FIG. 12a, and then withdraw the mobile computing platform 126 as illustrated in FIG. 12b in order to generate virtual graphic information 1201 at the desired location together with leader line 1210. While graphic information is shown as having a solid line rectangular border, it is to be understood that graphic information may be generated with any of a variety of border shapes and shading, or may be generated as borderless.

Further, references made in this disclosure to wireless communication, e.g., with regard to step in FIG. 3 are intended to mean direct wireless communication or indirect wireless communication between first and second components. By indirect wireless communication, it is meant that communication between the first and second components is via intermediate component or components, wherein at least one communication path between any of such first, second or intermediate components is by wireless communication, while the other communication paths may be wired communication paths.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other implementation.

What is claimed is:

1. A system configured to provide a mobile computing platform as a physical interface for an interactive space, the system comprising:

a device configured to be worn on a head of a user;

one or more image-forming components held by the device, the one or more image-forming components being configured to generate light rays to form images of virtual content, the one or more image-forming components being configured to present the images to the user and superimpose the images over views of a real-world environment to create an interactive space such that the virtual content is perceived to be present in the real-world environment, the virtual content including one or more virtual objects;

one or more physical processors configured by machine-readable instructions to: establish a wireless connection between the device and a mobile computing platform that is separate and distinct from the device, wherein user interactions with the mobile computing platform facilitate user interactions with the virtual content in the interactive space; obtain relative position information, the relative position information conveying a position and/or heading of the mobile computing platform relative to a perceived position and/or heading of the virtual content;

obtain user input information, the user input information conveying user entry and/or selection of one or more input elements of the mobile computing platform, the user entry and/or selection of the one or more input elements comprising part of the user interactions with the mobile computing platform;

determine remote command information based on the relative position information and the user input information, the remote command information being configured to effectuate the user interactions with the virtual content in the interactive space based on the user interactions with the mobile computing platform; and control the one or more image-forming components based on the remote command information, such that the one or more image-forming components are controlled to cause the images of the virtual content to reflect the user interactions with the virtual content, and control the one or more image-forming components to generate light rays forming an image of a virtual cursor, the image of the virtual cursor being configured such that the virtual cursor is perceived as being positioned at the perceived intersection, wherein the relative position information is determined to comprise:
a principle axis of the mobile computing platform, and
a principle direction of the mobile computing platform with respect to the principle axis,
wherein the principle axis extends perpendicular to a display surface of the mobile computing platform, and
wherein the virtual cursor has a shape indicative of an outline of the mobile computing platform.

2. The system of claim 1, wherein determining the remote command information based on the relative position information and the user input information comprises:
determining, based on the relative position information, a perceived selection of a virtual object; and
determining, based on the user entry and/or selection of the one or more input elements of the mobile computing platform, an interaction with the selected virtual object in the interactive space.

3. The system of claim 1, wherein determining the remote command information comprises:
identifying virtual content perceived to intersect with the principle axis along the principle direction.

4. The system of claim 3, wherein the one or more physical processors are further configured by the machine-readable instructions to:
control the one or more image-forming components to generate light rays forming an image of a virtual cursor, the image of the virtual cursor being configured such that the virtual cursor is perceived as being positioned at the perceived intersection.

5. The system of claim 3, wherein the identification of the virtual content perceived as intersecting with the principle axis along the principle direction conveys a selection of the virtual content by the user.

6. The system of claim 1, wherein the one or more input elements of the mobile computing platform include one or both of a physical element or a virtual element, the virtual element being presented on a display of the mobile computing platform.

7. The system of claim 6, wherein individual input elements correspond to individual interactions with the virtual content.

8. The system of claim 1, wherein the interactive space comprises an augmented reality space.

9. A method to provide a mobile computing platform as a physical interface for an interactive space, the method comprising:
establishing a wireless connection between a device and a mobile computing platform that is separate and distinct from the device, the device being configured to be worn on a head of a user, the device including one or more image-forming components configured to generate light rays to form images of virtual content, the one or more image-forming components being configured to present the images to the user and superimpose the images over views of a real-world environment to create an interactive space such that the virtual content is perceived to be present in the real-world environment, wherein user interactions with the mobile computing platform facilitate user interactions with the virtual content in the interactive space;
obtaining relative position information, the relative position information conveying a position and/or heading of the mobile computing platform relative to a perceived position and/or heading of the virtual content;
obtaining user input information, the user input information conveying user entry and/or selection of one or more input elements of the mobile computing platform, the user entry and/or selection of the one or more input elements comprising part of the user interactions with the mobile computing platform;
determining remote command information based on the relative position information and the user input information, the remote command information being configured to effectuate the user interactions with the virtual content in the interactive space based on the user interactions with the mobile computing platform; and
controlling the one or more image-forming components based on the remote command information, such that the one or more image-forming components are controlled to cause the images of the virtual content to reflect the user interactions with the virtual content,
wherein determining the remote command information based on the relative position information and the user input information comprises:
determining, based on the relative position information, a perceived selection of a virtual object; and
determining based on the user entry and/or selection of the one or more input elements of the mobile computing platform, an interaction with the selected virtual object in the interactive space, and wherein determining the perceived selection of the virtual object comprises determining that a distance between the virtual object and the mobile computing platform is less than a predetermined threshold.

10. The method of claim 9, wherein determining the relative position information comprises:
   determining a principle axis of the mobile computing platform; and
   determining a principle direction of the mobile computing platform with respect to the principle axis.

11. The method of claim 10, wherein determining the remote command information comprises:
   identifying virtual content perceived to intersect with the principle axis along the principle direction.

12. The method of claim 11, further comprising:
   controlling the one or more image-forming components to generate light rays forming an image of a virtual cursor, the image of the virtual cursor being configured such that the virtual cursor is perceived as being positioned at the perceived intersection.

13. The method of claim 11, wherein the identification of the virtual content perceived as intersecting with the principle axis along the principle direction conveys a selection of the virtual content by the user.

14. The method of claim 9, wherein the one or more input elements of the mobile computing platform include one or both of a physical element or a virtual element, the virtual element being presented on a display of the mobile computing platform.

15. Non-transitory electronic storage medium storing machine-readable instructions which, when executed by a mobile computing platform, cause the mobile computing platform to:
   establish a wireless connection between the mobile computing platform and device configured to be worn on a head of a user, the device including one or more image-forming components configured to generate light rays to form images of virtual content, the one or more image-forming components being configured to present the images to the user and superimpose the images over views of a real-world environment to create an interactive space such that the virtual content is perceived to be present in the real-world environment, wherein user interactions with the mobile computing platform facilitate user interactions with the virtual content in the interactive space;
   obtain output signals conveying position information and/or heading information, the position information and/or heading information conveying a position and/or heading of the mobile computing platform;
   obtain user input information, the user input information conveying user entry and/or selection of one or more input elements of the mobile computing platform, the user entry and/or selection of the one or more input elements comprising part of the user interactions with the mobile computing platform; and
   effectuate communication of the output signals and the user input information to the device, wherein the device utilizes the output signals and the user input information to control the one or more image-forming components to cause the images of the virtual content to reflect the user interactions with the virtual content,
   wherein determining the remote command information based on the relative position information and the user input information comprises:
      determining, based on the relative position information, a perceived selection of a virtual object; and
      determining, based on the user entry and/or selection of the one or more input elements of the mobile computing platform, an interaction with the selected virtual object in the interactive space, and
   wherein determining the perceived selection of the virtual object comprises determining that distance between the virtual object and the mobile computing platform is less than a predetermined threshold.

16. The non-transitory electronic storage medium of claim 15, wherein the method further comprises:
   effectuating presentation of the one or more input elements on a display of the mobile computing platform.

17. The non-transitory electronic storage medium of claim 15, wherein the output signals conveying the position information and/or heading information are generated by one or more sensors included with the mobile computing platform.

18. The non-transitory electronic storage medium of claim 15, wherein the mobile computing platform is a mobile phone or a tablet computing platform.

19. The system of claim 1, wherein the identification of the virtual content perceived as intersecting with the principle axis along the principle direction conveys a selection of the virtual content by the user.

20. The method of claim 9, wherein the principle axis extends perpendicular to a display surface of the mobile computing platform.

21. The method of claim 20, wherein determining the remote command information comprises:
   identifying virtual content perceived to intersect with the principle axis along the principle direction.

22. The method of claim 21, further comprising:
   controlling the one or more image-forming components to generate light rays forming an image of a virtual cursor, the image of the virtual cursor being configured such that the virtual cursor is perceived as being positioned at the perceived intersection.

23. The method of claim 22, wherein the identification of the virtual content perceived as intersecting with the principle axis along the principle direction conveys a selection of the virtual content by the user.

24. The method of claim 22, wherein the virtual cursor is a shape indicative of an outline of the mobile computing platform.

25. The system of claim 1, wherein the mobile computing platform further comprises an image sensor communicatively coupled to the one or more physical processors and wherein the image sensor facilitates the one or more physical processors determination of the principle direction of the mobile computing platform with respect to the principle axis.

26. The system of claim 1, wherein the mobile computing platform further comprises a haptic feedback actuator communicatively coupled to the one or more physical processors and wherein the one or more physical processors are configured to control the haptic feedback actuator to alert a user of the occurrence of an event in connection with at least one of remote command information, or the position and/or heading of mobile computing platform relative to the displayed virtual content.

27. The method of claim 10, wherein the relative position information is determined at least in part by image data generated by an image sensor disposed within the mobile computing platform.

28. The method of claim 10 further comprising the step of generating haptic feedback to a user of the mobile computing platform to alert the user of the occurrence of an event in connection with at least one of remote command information, or the position and/or heading of mobile computing platform relative to the displayed virtual content.

29. The method of claim 12, further comprising:
identifying graphic information to be associated with the virtual content;
presenting the graphic information as virtual content in the interactive space; and
visually associating the virtual graphic information with the virtual object.

30. The method of claim 29, wherein the visual association is provided by a virtual leader line.

31. The method of claim 9, further comprising:
identifying graphic information to be associated with the virtual content;
presenting the graphic information as virtual content in the interactive space; and
visually associating the virtual graphic information with the virtual object.

32. The method of claim 31, wherein the visual association is provided by a virtual leader line.

33. The method of claim 31, wherein the graphic information is displayed on the mobile computing platform, and thereby positioned in the interactive space proximate to its position on the display of the mobile computing platform.

34. The non-transitory electronic storage medium of claim 15, further comprising:
identifying graphic information to be associated with the virtual content;
presenting the graphic information as virtual content in the interactive space; and
visually associating the virtual graphic information with the virtual object.

35. The non-transitory electronic storage medium of claim 34, wherein the visual association is provided by a virtual leader line.

36. The non-transitory electronic storage medium of claim 34, wherein the graphic information is displayed on the mobile computing platform, and thereby positioned in the interactive space proximate to its position on the display of the mobile computing platform.

* * * * *